US012754003B2

(12) United States Patent
Kysar

(10) Patent No.: US 12,754,003 B2
(45) Date of Patent: Oct. 6, 2026

(54) SPEED SQUARE WITH HIGHLY VISIBLE LEVEL

(71) Applicant: Sven Kysar, Yacolt, WA (US)

(72) Inventor: Sven Kysar, Yacolt, WA (US)

( * ) Notice: Subject to any disclaimer, the term of this patent is extended or adjusted under 35 U.S.C. 154(b) by 246 days.

(21) Appl. No.: 18/381,090

(22) Filed: Oct. 17, 2023

(65) Prior Publication Data

US 2024/0142209 A1 May 2, 2024

Related U.S. Application Data

(60) Provisional application No. 63/416,667, filed on Oct. 17, 2022.

(51) Int. Cl.

*G01B 3/04* (2006.01)
*B43L 7/027* (2006.01)
*G01C 9/28* (2006.01)
*G01C 9/32* (2006.01)
*G01C 9/34* (2006.01)

(52) U.S. Cl.

CPC .............. *G01B 3/04* (2013.01); *B43L 7/0275* (2013.01); *G01C 9/28* (2013.01); *G01C 9/32* (2013.01); *G01C 9/34* (2013.01)

(58) Field of Classification Search

CPC ........... G01B 3/04; B43L 7/0275; G01C 9/28; G01C 9/32; G01C 9/34

See application file for complete search history.

(56) References Cited

U.S. PATENT DOCUMENTS

| | | | | | |
|---|---|---|---|---|---|
| D364,574 | S * | 11/1995 | Utz | D10/65 | |
| D428,348 | S * | 7/2000 | Hatfield | D10/65 | |
| 6,230,416 | B1 * | 5/2001 | Trigilio | G01C 15/008 | 33/DIG. 21 |
| 6,314,652 | B1 * | 11/2001 | English | G01C 9/26 | 33/421 |
| 6,725,556 | B1 * | 4/2004 | Graham | E04F 21/26 | 33/429 |
| 7,398,601 | B2 * | 7/2008 | Morrell | B25H 7/00 | 33/429 |
| 11,150,069 | B1 * | 10/2021 | Strong | G01C 9/06 | |
| 11,692,803 | B2 * | 7/2023 | Jones | G01B 3/566 | 33/429 |
| 12,145,397 | B2 * | 11/2024 | McGee | B43L 7/0275 | |
| 2004/0025360 | A1 * | 2/2004 | Obergoenner | G01C 9/28 | 33/382 |
| 2007/0277387 | A1 * | 12/2007 | Morrell | B43L 12/02 | 33/429 |
| 2016/0047650 | A1 * | 2/2016 | Butler | B43L 7/0275 | 33/381 |
| 2021/0310782 | A1 * | 10/2021 | Strong | G01C 9/36 | |
| 2023/0288178 | A1 * | 9/2023 | Jones | G01B 3/04 | |

(Continued)

*Primary Examiner* — Yaritza Guadalupe-Mccall

(74) *Attorney, Agent, or Firm* — Myers Andras Ashman Bisol LLP; Joseph C. Andras

(57) ABSTRACT

A speed square with a highly-visible level vial where the level vial and cushioning members are sandwiched and compressed between interacting portions of the square's blade and the square's heel, with the cushioning members positioned above the level vial adjacent to the blade, or below the level vial adjacent to the heel, as desired. The level vial may be fully contained with a thick heel, or may be positioned in order to be held partially or fully above the top surface of a thin or thick heel, within a viewing notched formed in the blade for better visibility.

23 Claims, 21 Drawing Sheets

LEVEL IN NARROW BLADE
ABOVE THIN HEEL
EASIER TO SEE

(56) References Cited

U.S. PATENT DOCUMENTS

| | | | | |
|---|---|---|---|---|
| 2024/0142209 | A1* | 5/2024 | Kysar | G01C 9/28 |
| 2025/0058580 | A1* | 2/2025 | McGee | G01C 15/002 |
| 2025/0277383 | A1* | 9/2025 | Kysar | G01B 3/566 |

* cited by examiner

LEVEL IN THICK WIDE HEEL
DIFFICULT TO SEE

DETAIL c
SCALE 3:1

DETAIL d
SCALE 2:1

THIN HEEL #1

THIN HEEL #2

THICK HEEL#1

THICK HEEL #2

THICK HEEL #3

THICK HEEL #4

THICK HEEL #5

THICK HEEL WITH BOTOM PLATE

SPEED SQUARE WITH HIGHLY VISIBLE LEVEL

CROSS-REFERENCE TO RELATED APPLICATIONS

The present invention claims the benefit of U.S. provisional patent application No. 63/416,667, filed Oct. 17, 2022, now pending.

FIELD OF THE INVENTION

The present invention relates generally to construction squares and, more particularly, to a speed square with a highly visible level.

DESCRIPTION OF THE RELATED ART

There are a wide variety of squares, which generally refers to a hand tool that has two perpendicular edges that are precisely 90 degrees apart, like the corner of a geometric square. There are many squares to choose from, including various L-shaped squares, T-shaped squares, triangle-shaped squares, and more. Some common L-shaped squares include framing squares, engineer's squares, try squares, and combination squares aka sliding squares. Some common T-shaped squares include drafting squares and drywall squares. Some common triangle-shaped squares are drafting triangles and speed squares (aka rafter squares or rafter angle squares). This application relates to speed squares.

Figure 1:
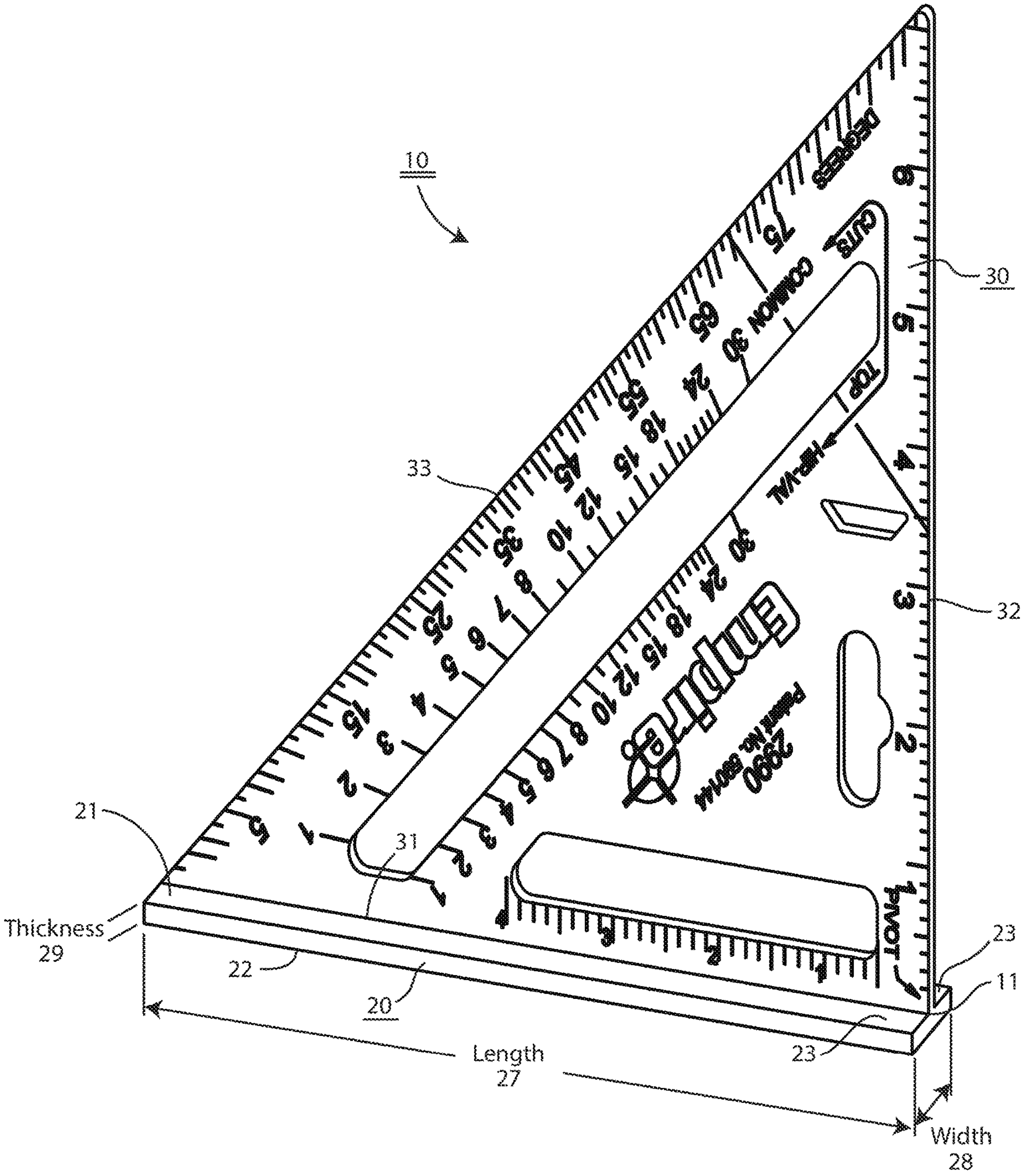
FIG. 1 PRIOR ART

FIG. 1 shows a conventional speed square 10 of unitary construction. It is sometimes called a rafter square or a rafter angle square because some carpenters use it to layout angled ends and notches in lumber that will serve as roof rafters, such as common rafters that rise upward from the top plate of a wall to a ridge board.

The speed square 10 shown is comprised of two main elements, namely a heel 20 and a triangular body or blade 30. The heel 20 is typically provide as a parallelepiped having six faces, including a top face 21 and a bottom face 22. The heel is further characterized by having a length 27, a width 28, and a thickness 29. The triangular blade 30 is usually provided as an isosceles triangle having a first equal side 31, a second equal side 32, and a long side 33, with included angles of 45-, 45-, and 90-degrees respectively. The second equal side 32 will sometimes hereinafter be called the "short side 32" due to its connection to the heel 20 and its short length relative to the long side 33. The heel's top face 21 is connected to the blade's first equal side 31 and thereby forms lips 23, 23 on opposite sides of the blade 30, at the perpendicular interface between the heel 20 and the blade 30.

The speed square 10 earns its name because the lips 23, 23 formed by the heel 20 allow the carpenter to quickly and assuredly press the square's heel 20 against the edge of some material, the long edge of a 2×4 for example, and then draw a line at a perfect 90-degree angle relative to that edge by using the blade's short side 32 as a straight edge or, if desired, to draw a line at a 45-degree angle relative to that edge by using the blade's long side 33 as a straight edge.

The short side 32 of the square is usually marked with distance markings, say in inches and fractions thereof, for making quick ruler-like measurements and related marks.

The long side 33 usually has angle markings that allow the upper surface 21 of the square's heel 20 to be pressed against an edge and then pivoted about a pivot point 11 (labeled "PIVOT" here) until a desired angle number on the long side

33 aligns with the same edge. When the desired angle is reached, a line can be drawn onto the workpiece at the desired angle along the short side 32 of the square's blade 30.

Figure 2:
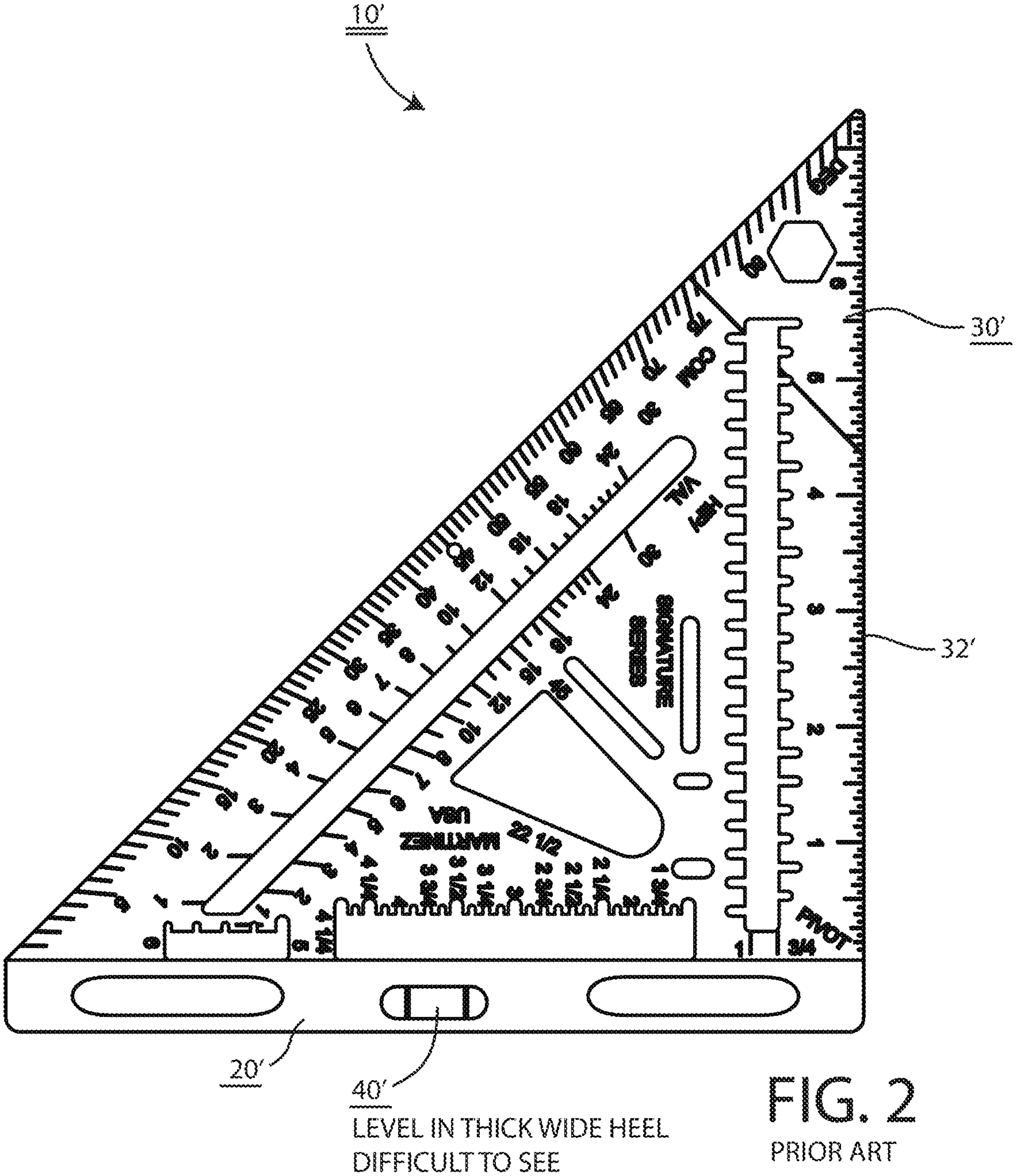
FIG. 2 PRIOR ART

FIG. 2 shows a currently available speed square 10' of multipiece construction, one that features a level or level vial 40'. In more detail, it has an elongated heel 20' formed from elongated left and right sides that are connected together by screws (not shown), a triangular blade 30', and a vial 40' built entirely into the heel 20'. With this level-enhanced speed square 10', a carpenter can quickly confirm a workpiece is level. In addition, the carpenter can position the square 10' against the side of an angled piece of material like a rafter, with its heel 20' on top, level the heel 20' of the square 10' by visually referring to the bubble in the vial 40', and then strike a plumb line onto the rafter along the short side 32' of the square 10'.

Unfortunately, because the vial 40' is generally surrounded by the relatively tall and relatively thick heel 20', it is difficult to see the bubble in the vial 40' unless one is viewing the vial 40' directly from the side. In other words, as constructed, it is often difficult for the carpenter to easily see the status of the bubble in the vial 40'. There remains a need, therefore, for a speed square with a highly visible level.

SUMMARY OF THE INVENTION

In one embodiment of the present invention, a square with a level vial is provided where the comprises a blade; a heel; a level vial; a cushioning member; and interacting portions of the blade and heel configured to compress the level vial and cushioning member together when the blade is connected to the heel.

In another embodiment of the present invention, a square with a level vial is provided. It uniquely comprises a blade of generally triangular shape having a first bottom edge, a second perpendicular edge that is perpendicular to the first bottom edge, and a third long edge that defines a hypotenuse between the first bottom edge and the second perpendicular edge; a heel of generally parallelepiped shape with an elongated body having top, bottom, front, and back faces, and two ends; a level vial; a cushioning member; fasteners for connecting the first bottom edge of the triangular blade to the top face of the heel; and interacting portions of the triangular blade and the heel configured to compress the level vial and cushioning member together when the first bottom edge of the triangular blade is connected to the top face of the heel.

The cushioning members, preferably formed from a pair of spaced rubber balls, may be provided above the level vial and adjacent to the blade, or below the level vial and adjacent to the heel. The level vial may be fully located within the heel (if sufficiently thick), or located partially or fully above a top surface of the heel when the blade is provided with a suitable viewing notch.

DRAWINGS

Figure 3:
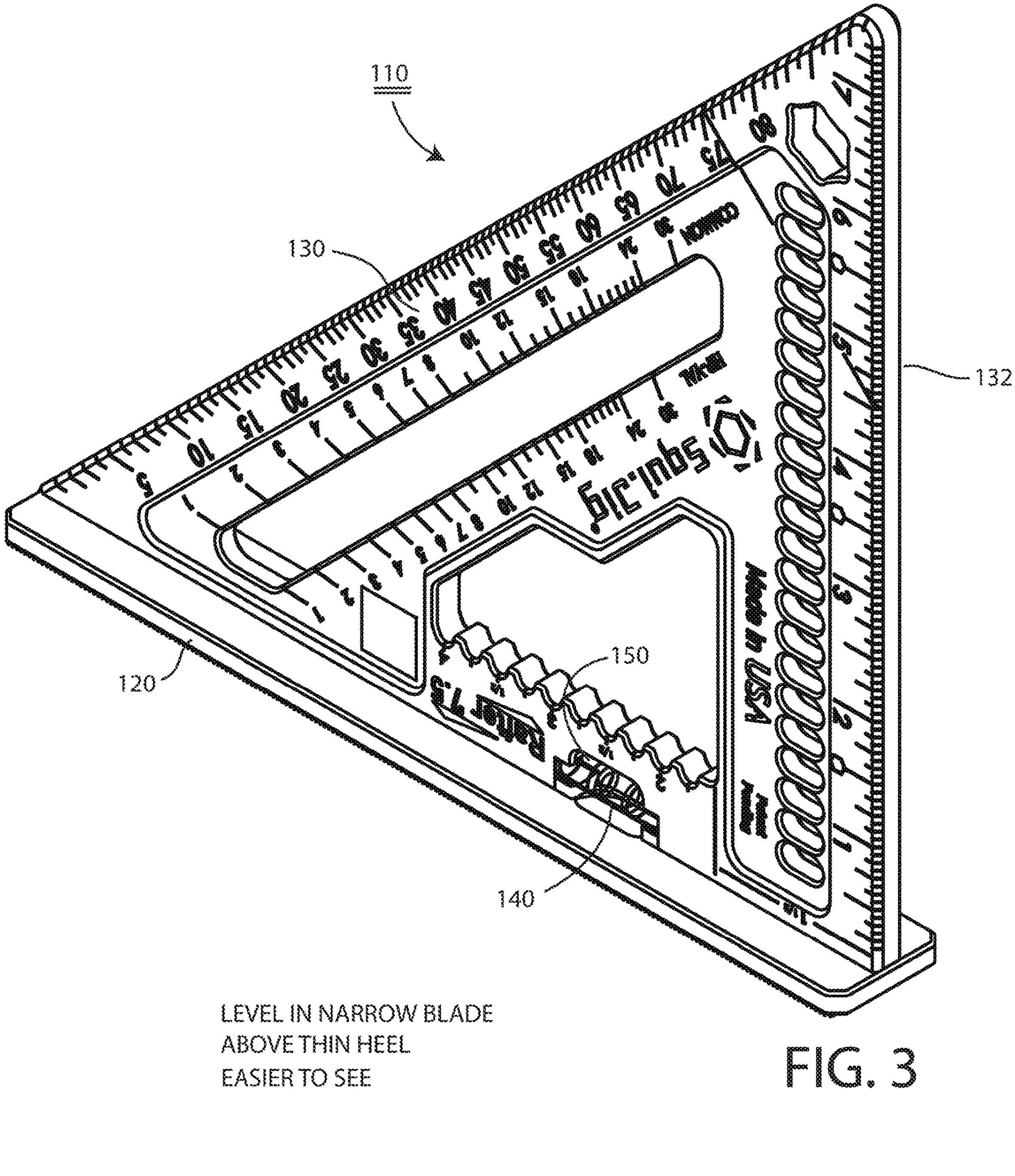
Figure 4:
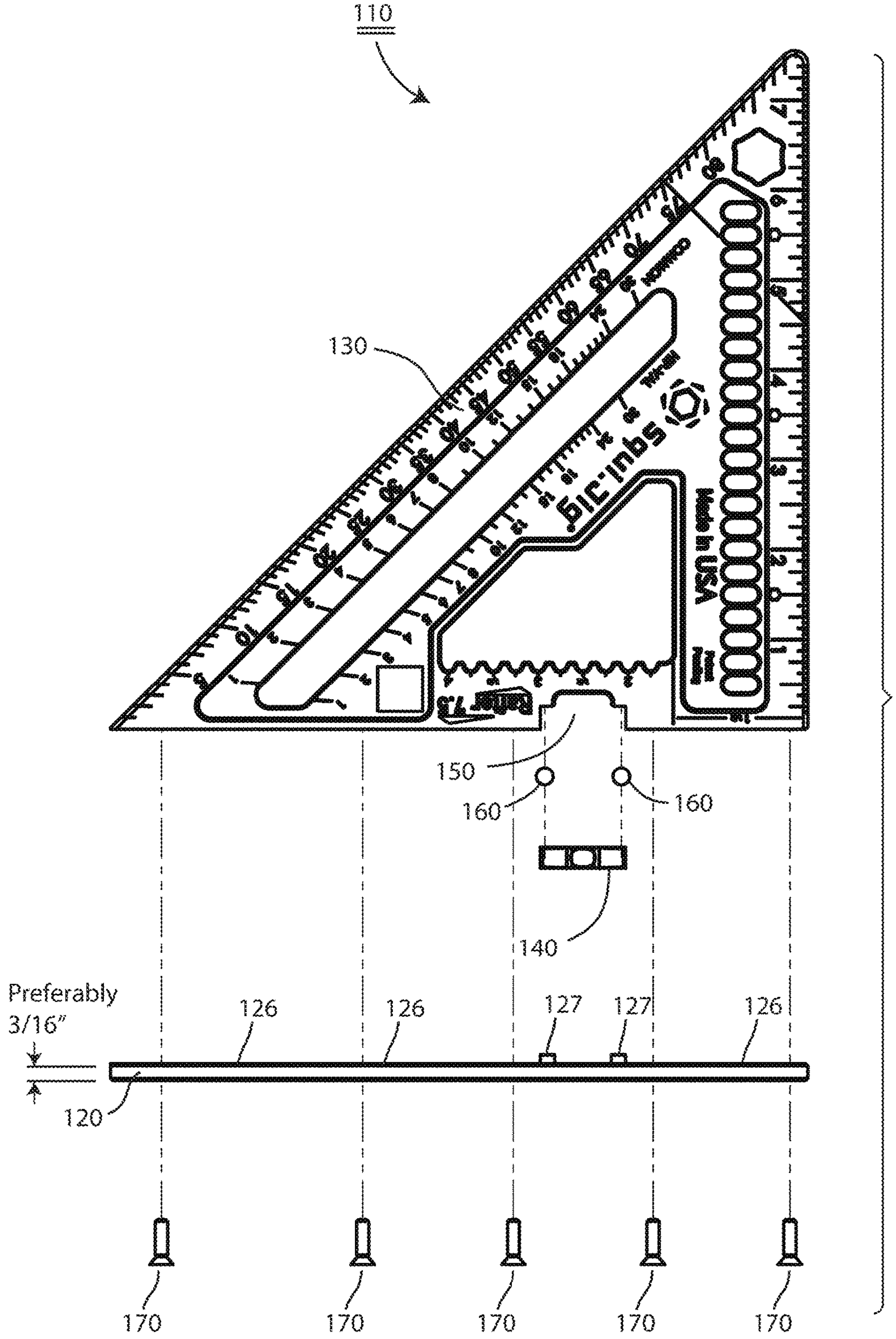
Figure 5:
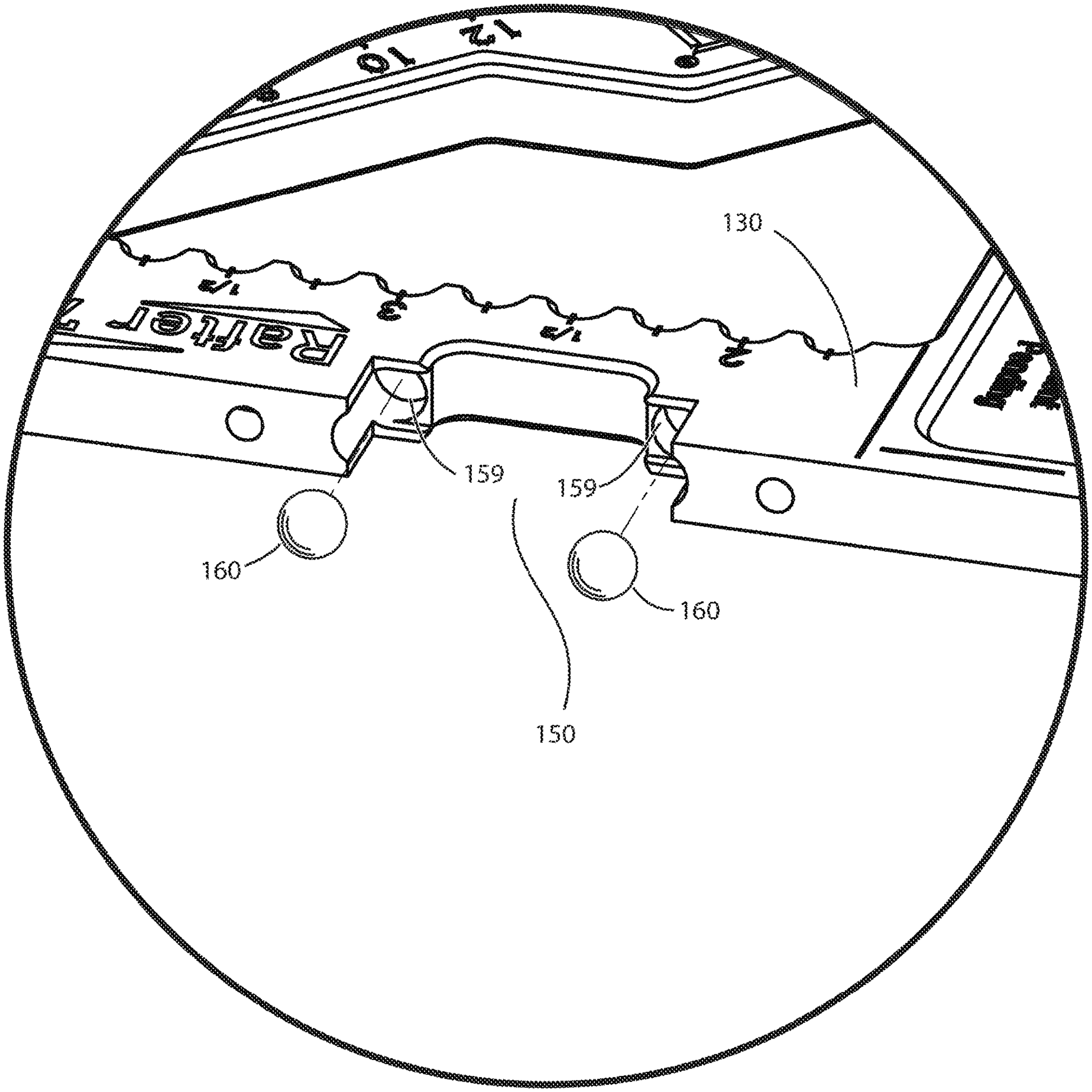
Figure 6:
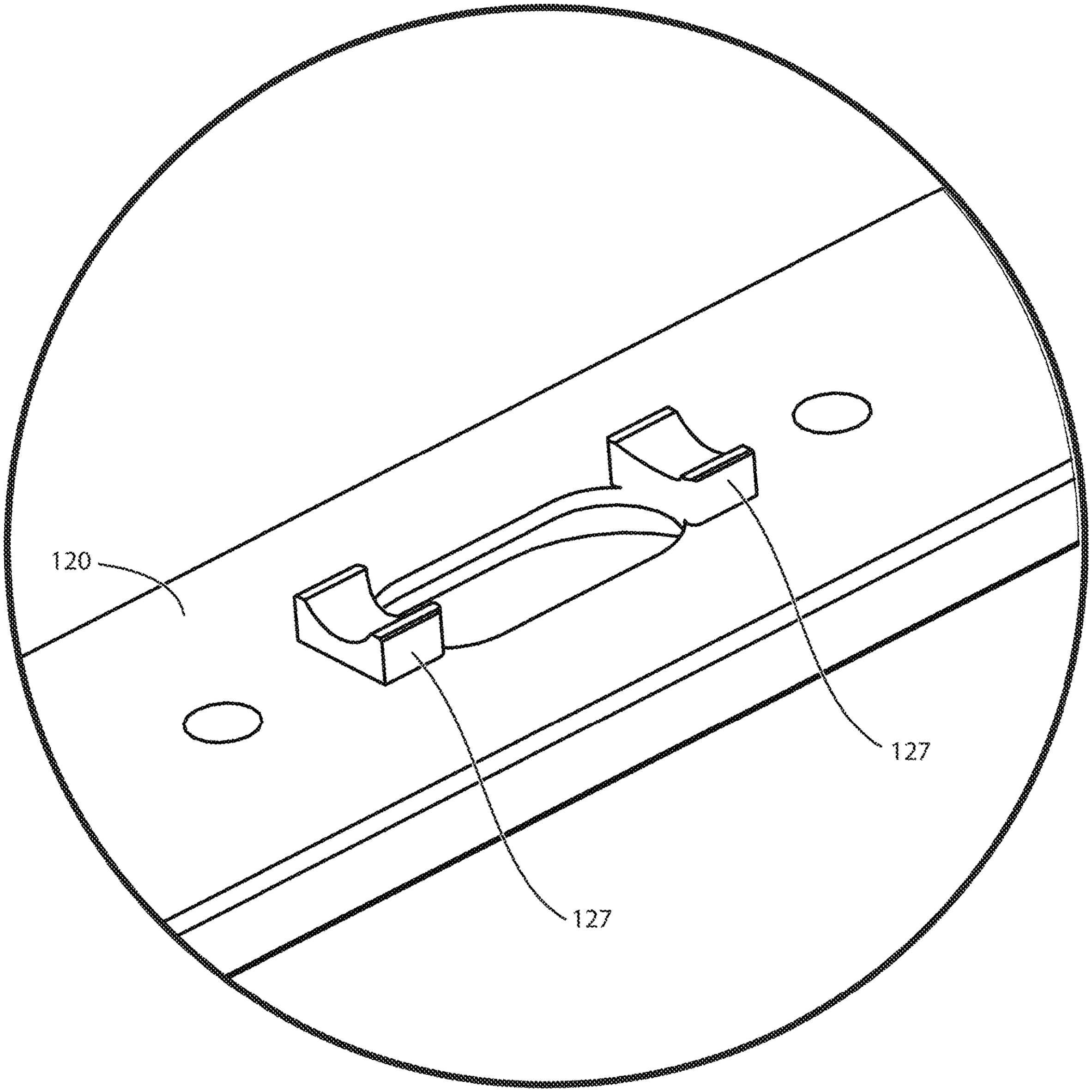
Figure 7:
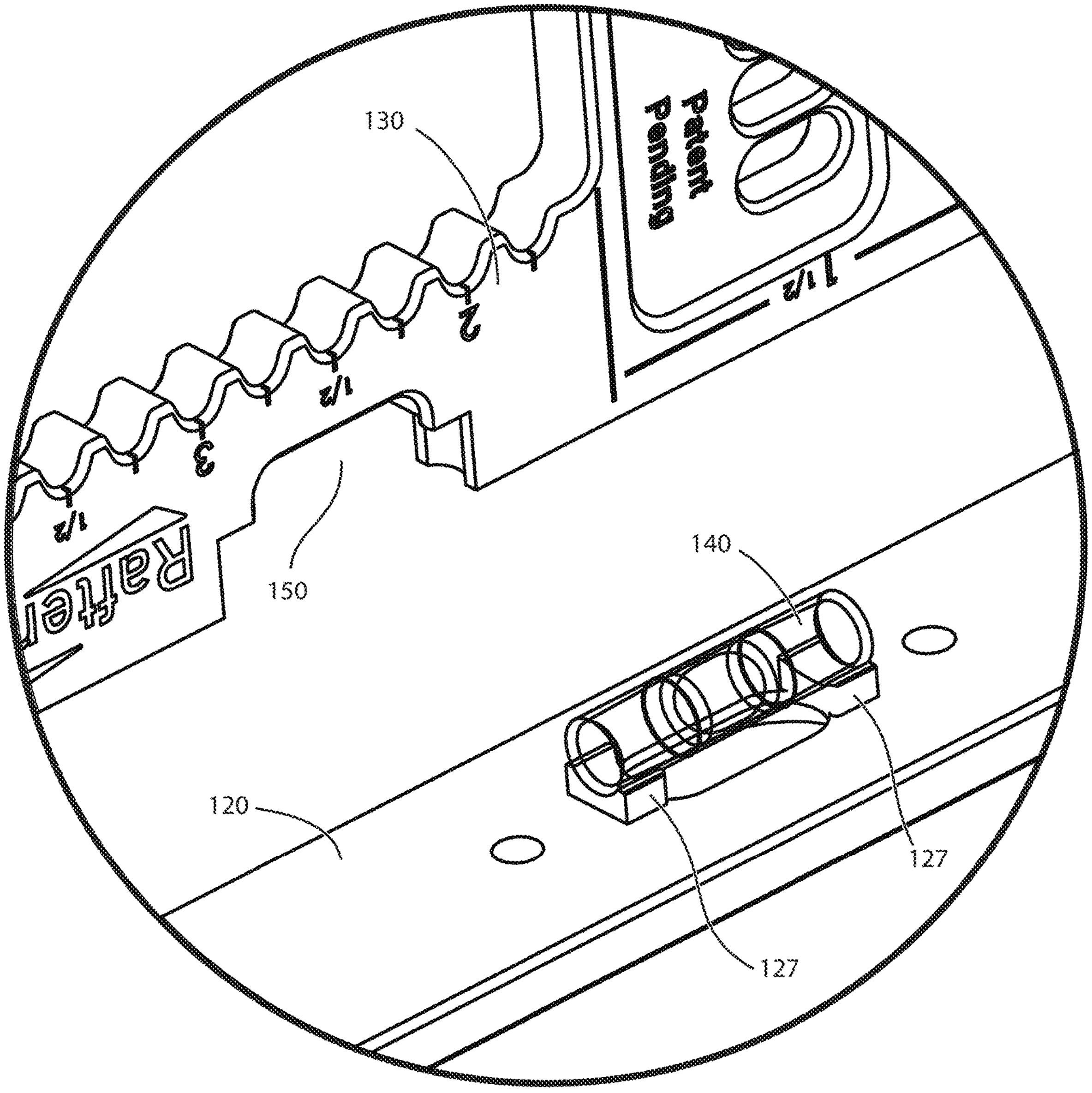
Figure 8:
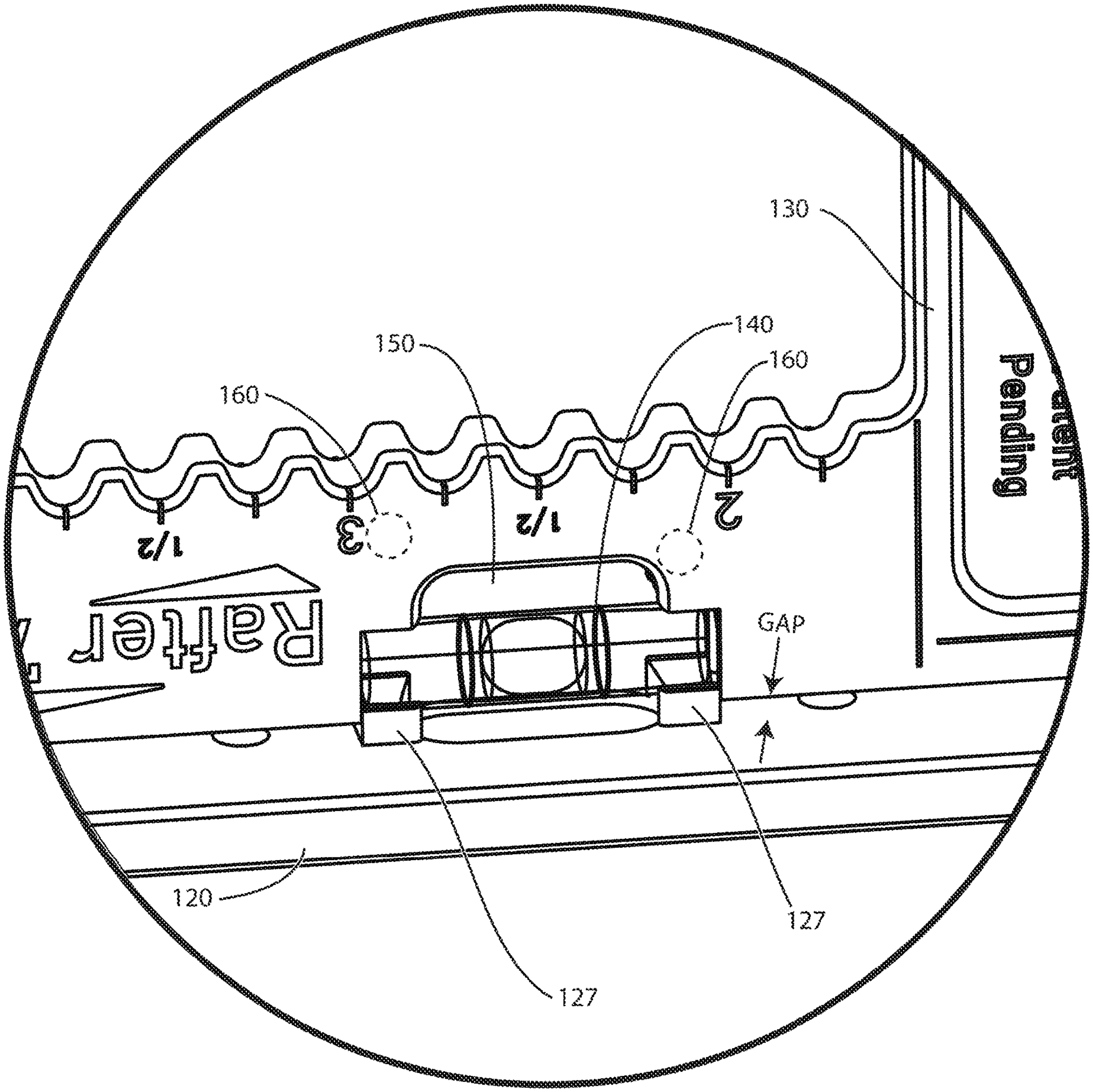
Figure 9:
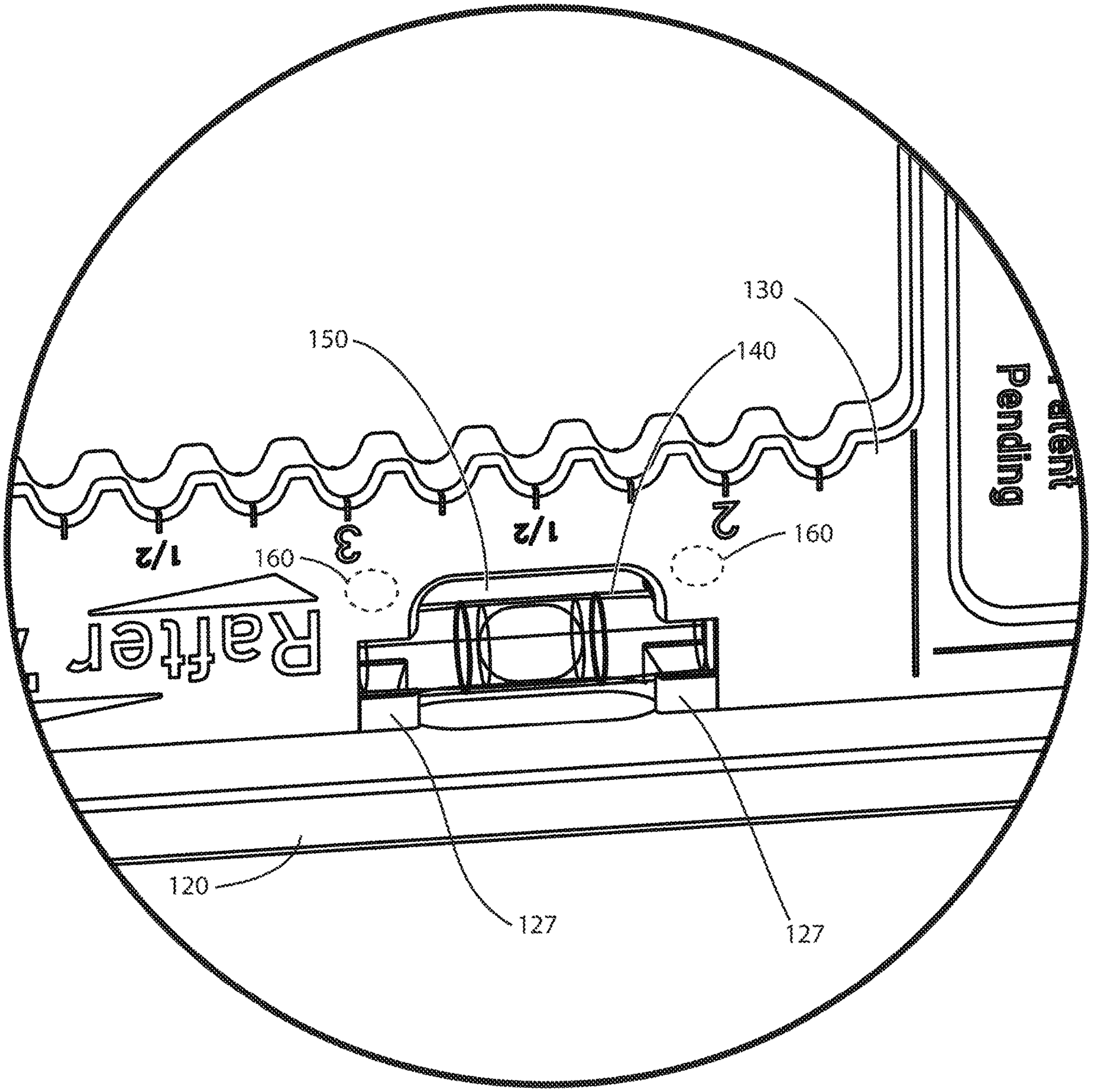
Figure 13:
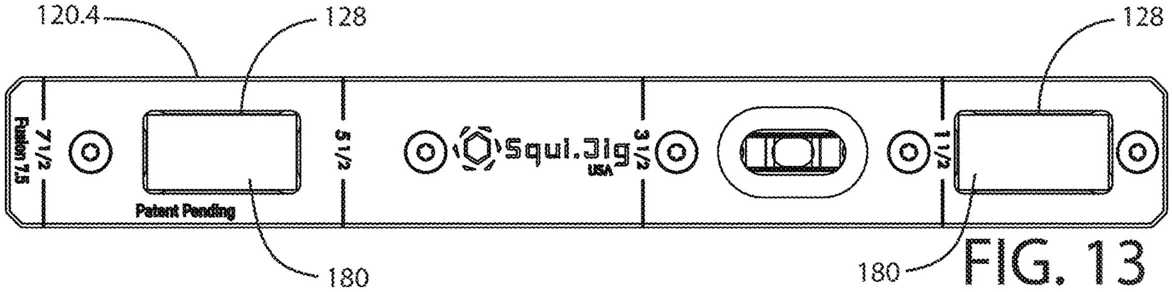
Figure 14A:
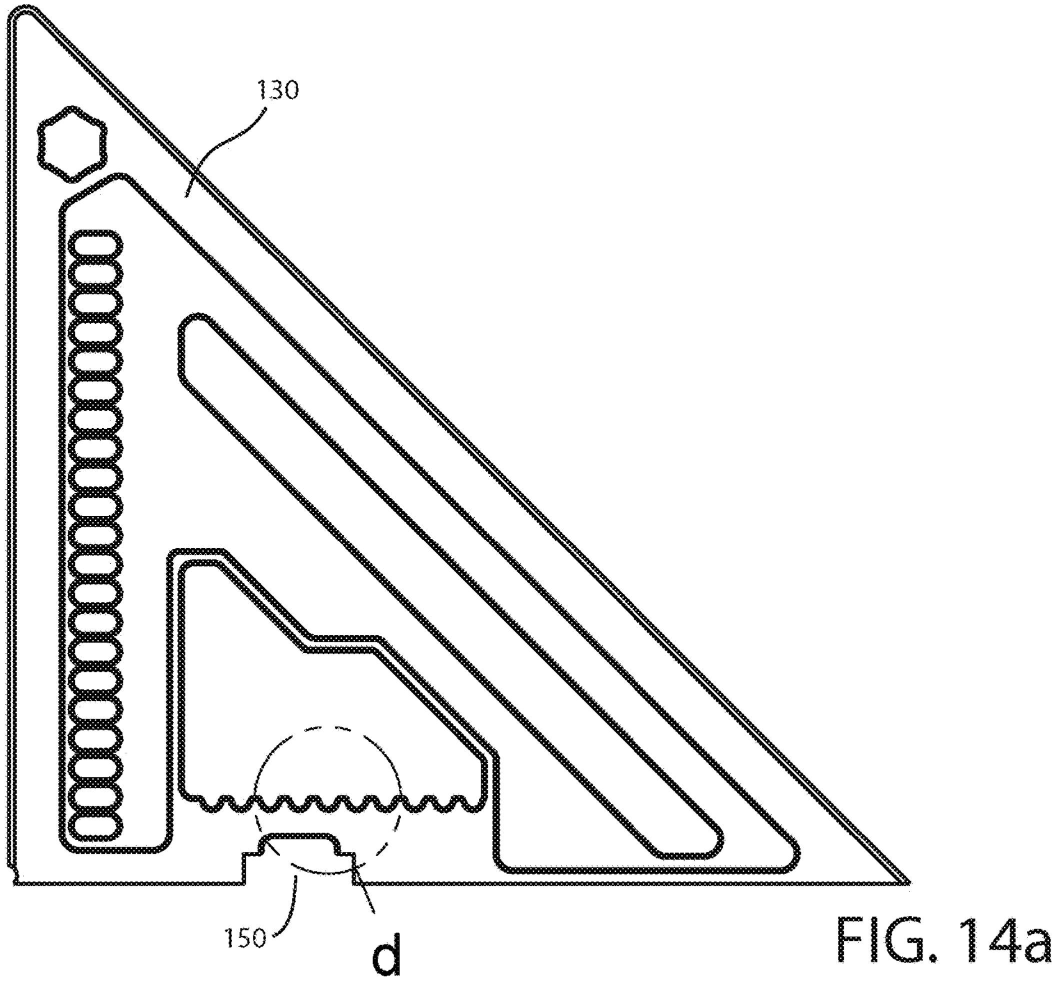
Figure 14B:
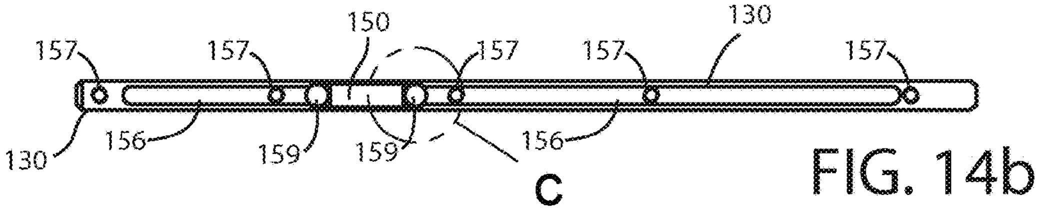
Figure 14C:
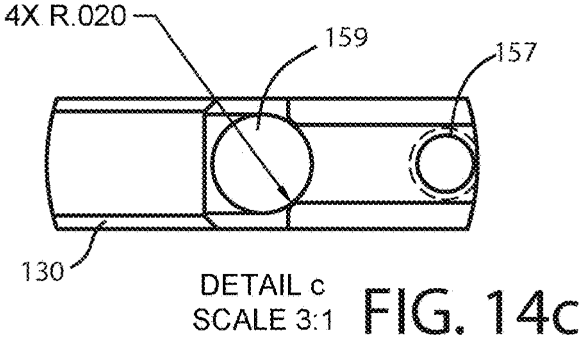
Figure 14D:
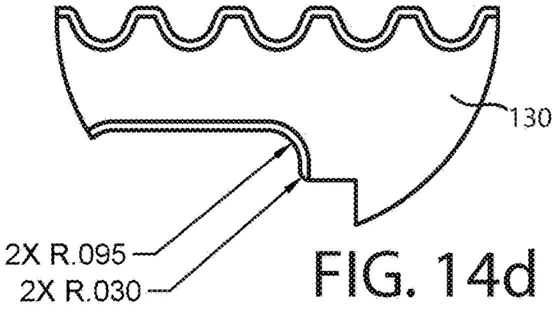
Figure 15A:
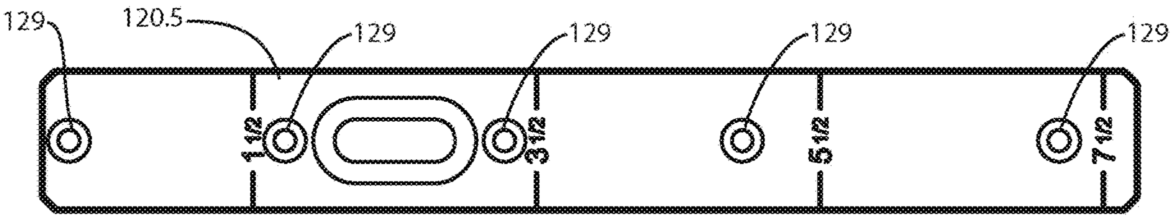
Figure 15B:
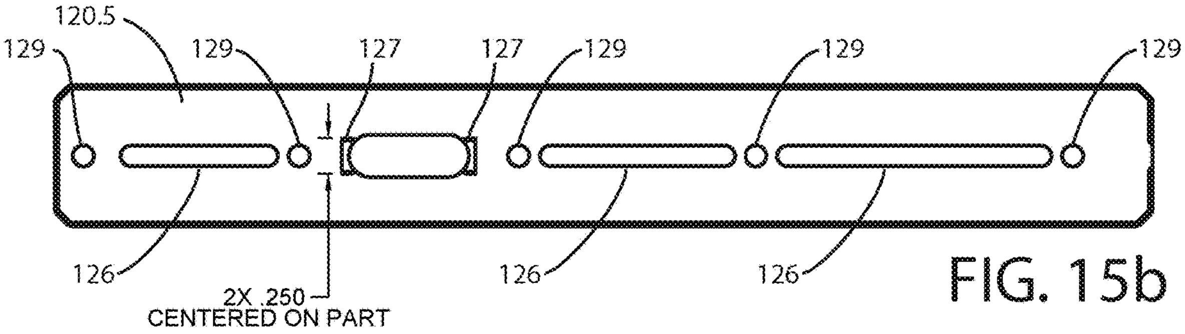
Figure 15C:
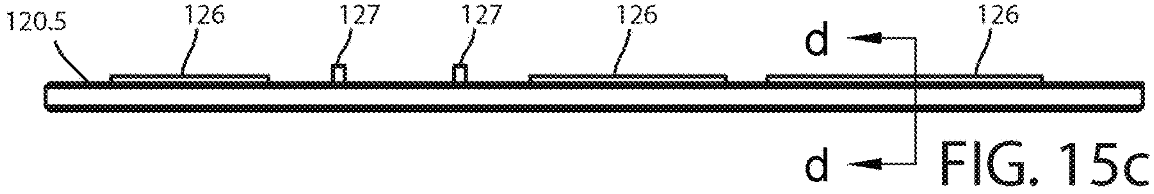
Figure 15D:
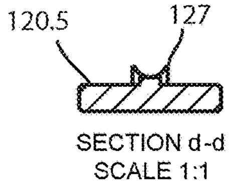
Figure 16A:
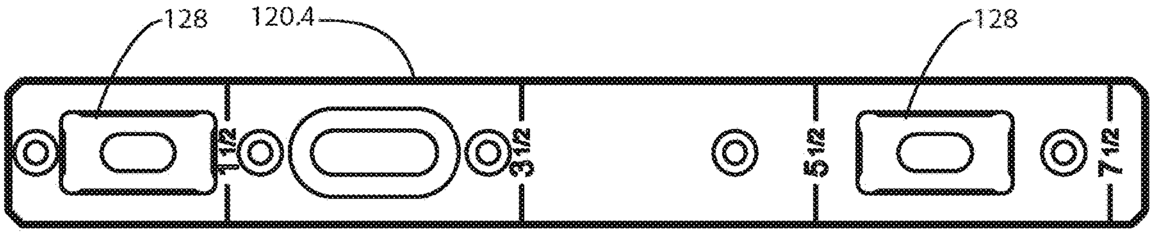
Figure 16B:
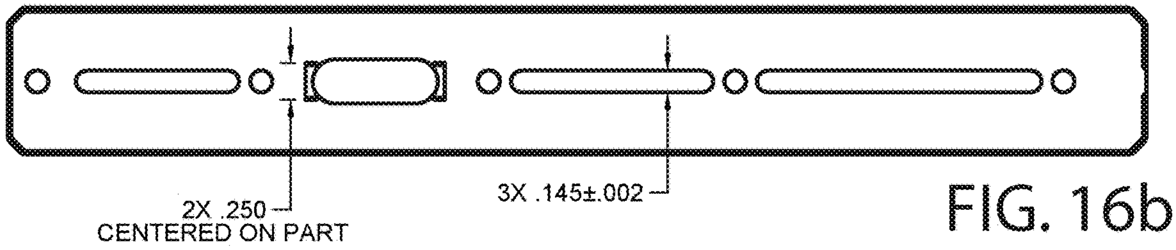
Figure 16C:
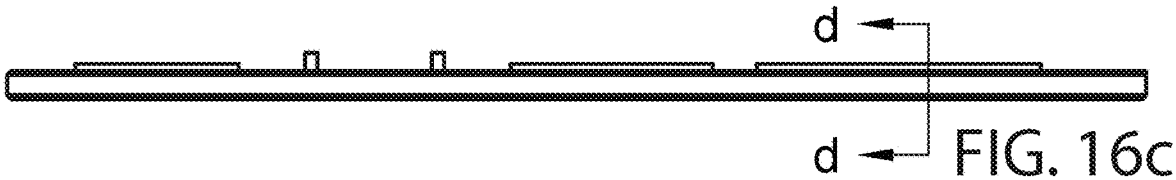
Figure 16D:
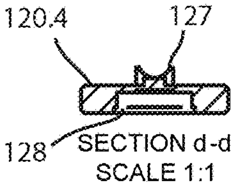

The invention is generally shown by way of reference to the accompanying drawings in which:

FIG. 1 shows a prior art speed square 10 of unitary construction where a heel 20 and a blade 30 are integrally formed from a unitary piece of metal;

FIG. 2 shows a prior art speed square 10' of multipiece construction formed from a heel 20' and a separate blade 30' where a level vial 40' is contained in the speed square's heel 20', but is relatively difficult to see;

FIG. 3 shows a speed square 110 with a highly visible level vial 140 according to a first preferred embodiment of the invention, the speed square 110 being of multipiece construction formed from a heel 120, a separate blade 130, and a level vial 140 located above the heel 120 and in a viewing notch 150 formed in the relatively narrow blade 130;

FIG. 4 is an exploded view of the speed square 110 from FIG. 3;

FIG. 5 is a closeup view of the viewing notch 150 in the blade 130, the viewing notch featuring a pair of hemispherical seats 159 for receiving rubber cushioning balls 160;

FIG. 6 is a closeup view of the heel 120 showing a pair of spaced, upward projecting saddles, or vial supports 127, 127 that rise upward from the top of the heel 120;

FIG. 7 is a closeup view showing how the level vial 140 rests in the vial supports 127 for subsequent insertion into the viewing notch 150;

FIG. 8 is a closeup view showing the blade 130 being pressed down onto the heel 120 such that the level vial 140 is inserted into the blade's viewing notch 150 until the top of the vial 140 just begins to press against the rubber cushioning balls 160 (circular dashed lines) while there is still a small gap between the blade 130 and the heel 120;

FIG. 9 is a closeup view that corresponds to FIG. 8, but after the blade 130 has been fully attached to the heel 120 such that the rubber cushioning balls 160 (oval dashed lines) are slightly compressed so as to hold the vial 140 in place with some degree of protection (note the absence of the gap that is visible in FIG. 8);

FIG. 10 to 13 show various embodiments for the heel 120, including a basic heel 120.1 which provides a measurement scale with side-located indicia (hexagons) for marking standard dimensional lumber widths (1.5", 3.5", 5.5", and 7.5"), a magnet-enhanced heel 120.2 which adds seats 128 for holding magnets; a magnet-enhanced heel 120.3 which includes alternative indicia (central hexagons), and a magnet-enhanced heel 120.4 which omits the measurement scale but retains dimensional lumber indicia;

FIGS. 14*a* to 14*d* show the presently preferred blade 130 including its viewing notch 150, cushioning member seats 159, 159, elongated notches 156 for receiving elongated alignment bosses that extends upward from the heel 120, and threaded apertures 157 for fastening the heel 120 to the blade 130;

FIGS. 15*a* to 15*d* are various views of a basic heel 120.5, without magnets, including in order, a bottom view, a top view, a side view, and a cross-sectional view, showing elongated bosses 126, the vial seats 127, and a plurality of screw apertures 129;

FIGS. 16*a* to 16*d* are various views of the heel 120.4 shown in FIG. 13, which is similar to the heel 120.5 of FIGS. 15*a* to 156*d* except that it has seats 128 for holding magnets (not shown), including in order, a bottom view, a top view, a side view, and a cross-sectional view; and FIGS. 17*a* to 24*a*, and corresponding FIGS. 17*b* to 24*b*, respectively, show eight alternative embodiments for speed squares 110, 210, 310, 410, 510, 610, 710, and 810. The "a"-suffix figures show each embodiment in exploded form, and the "b"-suffix figures show a transverse, cross-sectional close-up of each fully-assembled speed square within a circular region that surrounds and sections through each level and surrounding structure.

DETAILED DESCRIPTION

FIGS. 3 to 16*d* show a first preferred embodiment of a speed square 110 with a highly visible level vial 140. As best shown in FIGS. 3 and 4, taken together, the preferred speed square 110 is of multipiece construction, formed from a thin heel 120, a blade 130, and a level vial 140 that is uniquely sandwiched between the heel 120 and the blade 130, along with a pair of cushioning, compression, shock-absorbing members 160, e.g. a pair of small rubber balls 160. In this embodiment, as with others, the blade 130 includes a viewing notch 150 at a bottom edge, and the level 140 is held at least partially above or proud of the heel 120, within the viewing notch 150.

In the exploded view of FIG. 4, one can see that the interacting portions of the first preferred embodiment. Here, the heel 120 of the first preferred speed square 110 includes a pair of spaced, upward projecting saddles, or vial supports 127, 127 that rise upward from the top of the heel 120, in order to support the level vial 140 in an elevated position. As explained further below, the interacting portions of the blade and heel may be varied, as desired, to position the level vial in various locations (in the heel if thick enough, partially above the heel, or fully above the heel) and, when above the heel, within a notch provided in the blade.

FIGS. 14*a* to 14*d* show the presently preferred blade 130 and its interacting portion including its viewing notch 150, cushioning seats 159, 159, elongated notches 156 for receiving elongated connection bosses that extend upward from the heel 120, and threaded apertures 157 for fastening the heel 120 to the blade 130.

FIG. 5 is a closeup view of the viewing notch 150 in the bottom edge of the blade 130. As shown, the viewing notch 150 features a pair of hemispherical seats 159 for receiving the rubber cushioning balls 160.

FIGS. 5-9, taken together, show how the first preferred speed square 110 is assembled with the level 140 and rubber cushioning balls 160 sandwiched between the heel 120 and the blade 130. In FIG. 5, the cushion balls 160 are placed into the hemispherical seats 159 on either side of the viewing notch 150. FIG. 6 shows the saddles 127, and FIG. 7 shows the vial 140 placed on top of the saddles 127.

FIG. 8 is a closeup view showing the blade 130 being pressed down onto the heel 120 such that the level vial 140 is inserted into the blade's viewing notch 150 until the top of the vial 140 just begins to press against the rubber cushioning balls 160 (circular dashed lines) while there is still a small gap between the blade 130 and the heel 120.

FIG. 9 is a closeup view that corresponds to FIG. 8, but after the blade 130 has been fully attached to the heel 120 such that the rubber cushioning balls 160 (oval dashed lines) are slightly compressed so as to hold the vial 140 in place with some degree of protection (note the absence of the gap that is visible in FIG. 8).

Various Heel Embodiments

Figure 10:
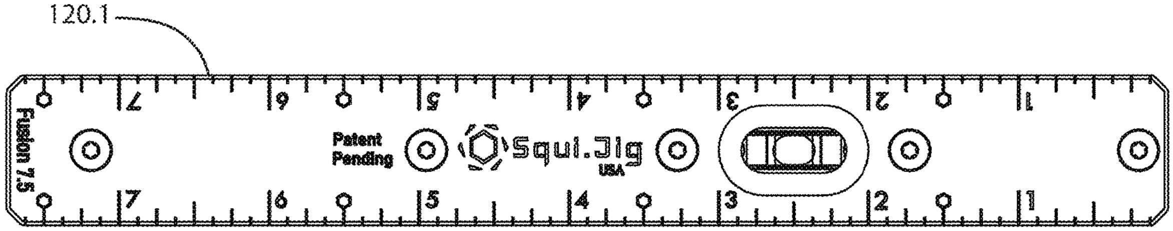
Figure 11:
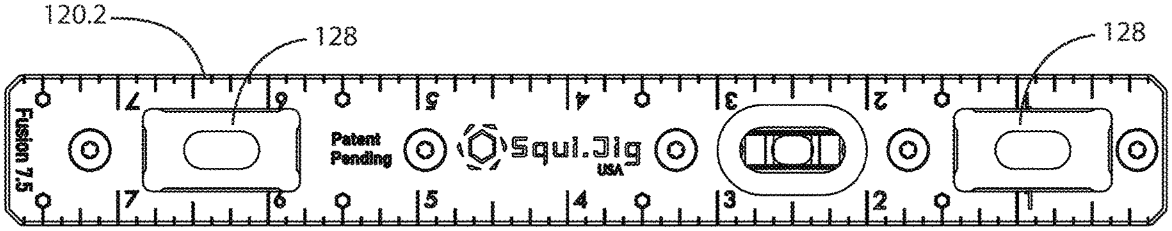
Figure 12:
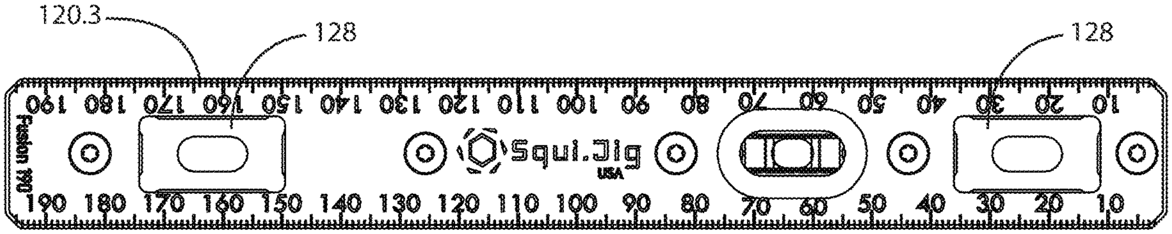

FIGS. 10 to 13, 15*a* to 15*d*, and 16*a* to 16*d* show various embodiments for the heel 120, including heels 120.1, 120.2, 120.3, 120.4, and 120.5. FIG. 10 shows a basic heel 120.1 which provides a measurement scale with side-located indicia (hexagons) for marking standard dimensional lumber widths (1.5", 3.5", 5.5", and 7.5"). FIG. 11 shows a magnet-enhanced heel 120.2 which adds seats 128 for holding magnets. FIG. 12 show another magnet-enhanced heel 120.3 which includes alternative indicia (central hexagons). FIG. 13 shows yet another magnet-enhanced heel 120.4 which omits the measurement scale but retains dimensional lumber indicia.

FIGS. 15*a* to 15*d* are various views of a basic heel 120.5, without magnets, including in order, a bottom view, a top view, a side view, and a cross-sectional view, showing elongated bosses 126, the vial seats 127, and a plurality of screw apertures 129.

FIGS. 16*a* to 16*d* are various views of the heel 120.4 shown in FIG. 13, which is similar to the heel 120.5 of FIGS. 15*a* to 156*d* except that it has seats 128 for holding magnets (not shown), including in order, a bottom view, a top view, a side view, and a cross-sectional view.

Review of First Preferred and Alternative Embodiments

FIGS. 17*a* to 24*a*, and 17*b* to 24*b*, respectively, show eight different embodiments for speed squares 110, 210, 310, 410, 510, 610, 710, and 810. The "a"-suffix figures show each embodiment in exploded form, and the "b"-suffix figures show a transverse, cross-sectional close-up of each fully-assembled speed square within a circular region that surrounds and sections through each level and surrounding structure.

Figure 17A:
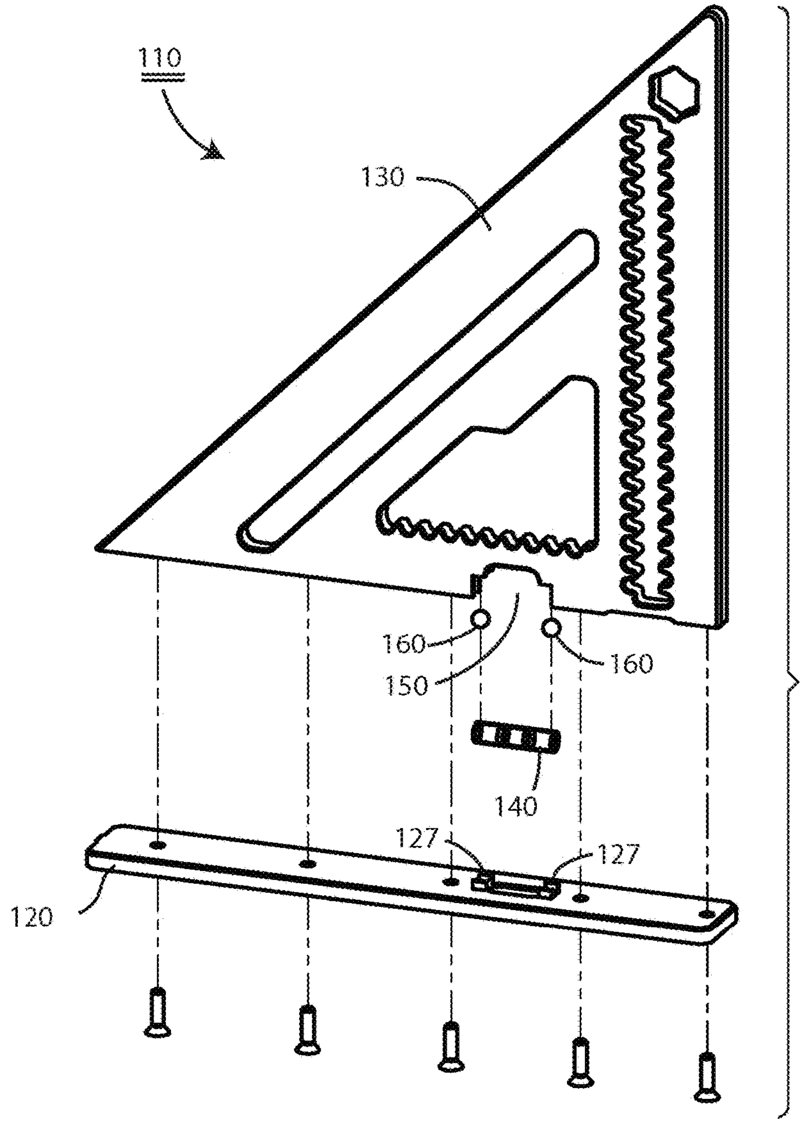
Figure 17B:
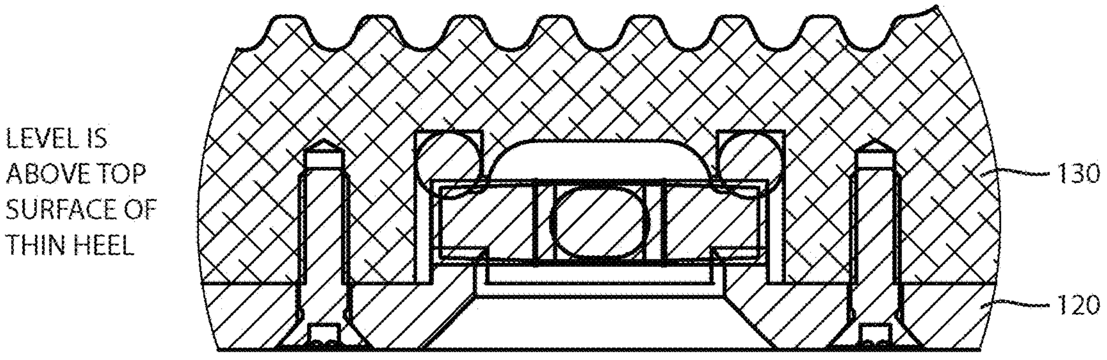

In FIGS. 17*a* and 17*b*, the first preferred embodiment 110 sandwiches a level 140 and cushioning members 160 between a thin heel 120, with the cushioning members 160 located above the level 140, adjacent to the blade 130. The heel 120 has upward projecting saddles 127 that hold the level 140 upward above the top surface of the heel 120 and into the blade's notch 150, and the blade 130 has hemi-spherical seats 159 that hold the cushioning member 160 above the level 140.

FIGS. 18*a* to 24*a*, and 18*b* to 24*b*, respectively, related to the fact that there are, of course, numerous other possible embodiments for the interacting portions of the blade and hell for securing a level therebetween, and the fact that the cushioning members 160 can be located on the heel-side of the vial 140, or on the blade-side of the vial 140 with equal efficacy. The speed squares 110 and 210 are "thin heel" embodiments, whereas the speed squares 310 to 810 are "thick heel" embodiments.

Thin Heel Embodiments

FIGS. 17*a* and 17*b* show the first preferred speed square 110 where the cushioning members 160 are above the vial 140 and the vial 140 is held above the heel 120. The other FIGS. 18 to 24 show several additional embodiments. When appropriate, the drawings of these alternative embodiments use the same numbering scheme, but with the leading digit increment by 1, e.g. 210 instead of 110, and 250 instead of 150, etc. When the items shown are identical, e.g. level vial 140 and cushioning balls 160, the same numbers are used.

Figure 18A:
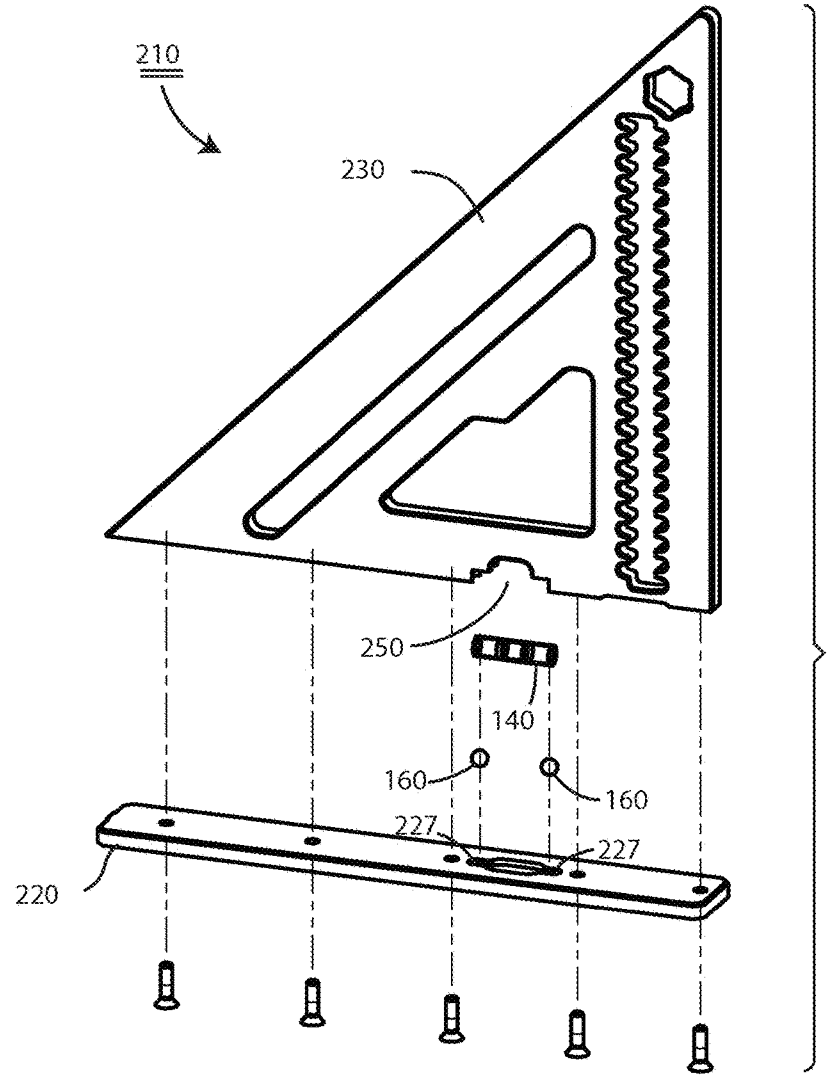
Figure 18B:
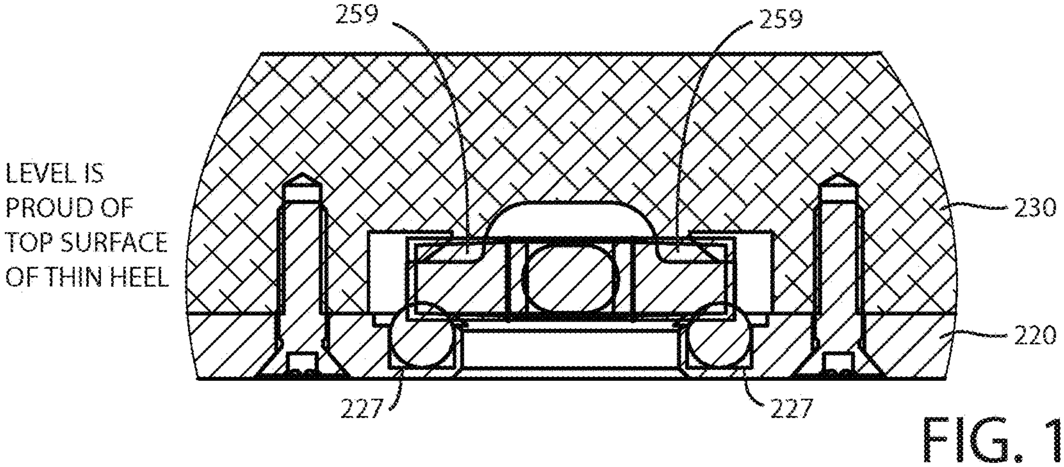

FIGS. 18*a* and 18*b* show a second preferred speed square 210 that also features a thin heel 220. Here, however, the vial 140 is above the cushioning members 160. The heel 220, therefore, does not include the saddles 127, but rather includes a pair of depressions 227 for receiving the heel-side cushioning members 160. The blade 230 has a viewing notch 250, but instead of depressions 159, it has downward projecting saddles 259 that seat against the vial 140. In this embodiment, the vial 140 is proud of the top surface of the heel 220, but it sits a bit lower than was the case with the first preferred speed square 110.

Thick Heel Embodiments

FIGS. 19 to 23, each containing a perspective figure "a" and a closeup view "b," show five different thick heel embodiments where the level 140 and cushioning members 160 are captured between the heel and the blade, with the level 140 in progressively higher positions.

Figure 19A:
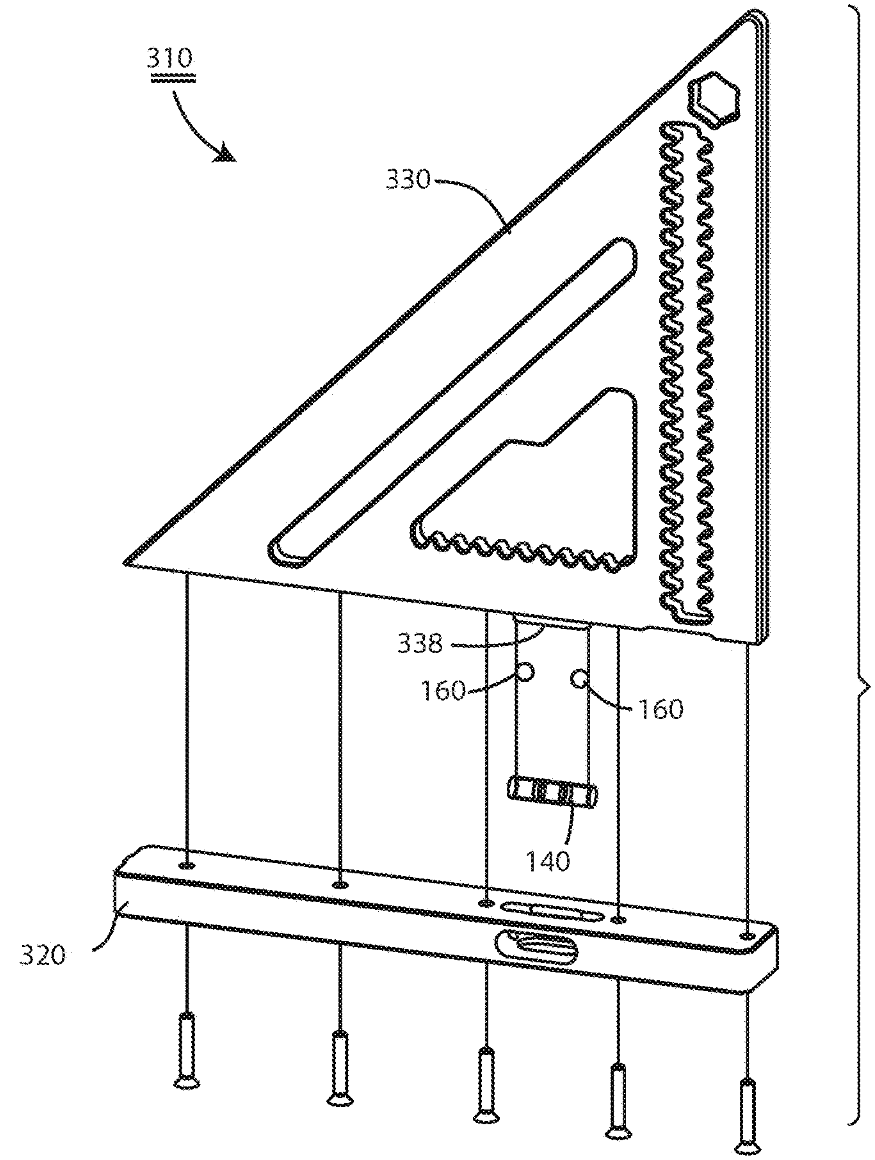
Figure 19B:
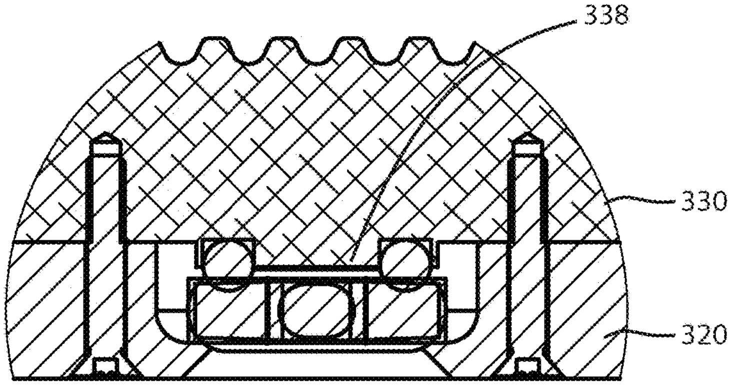
Figure 20A:
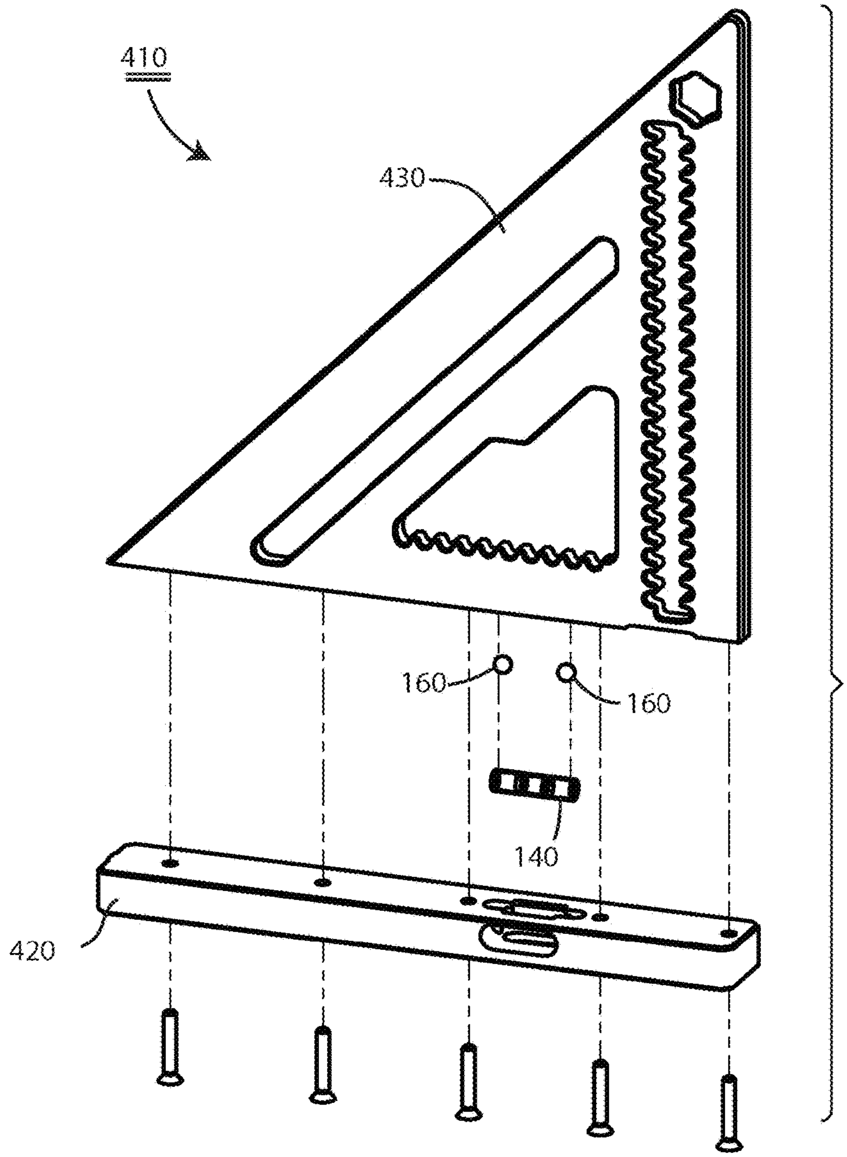
Figure 20B:
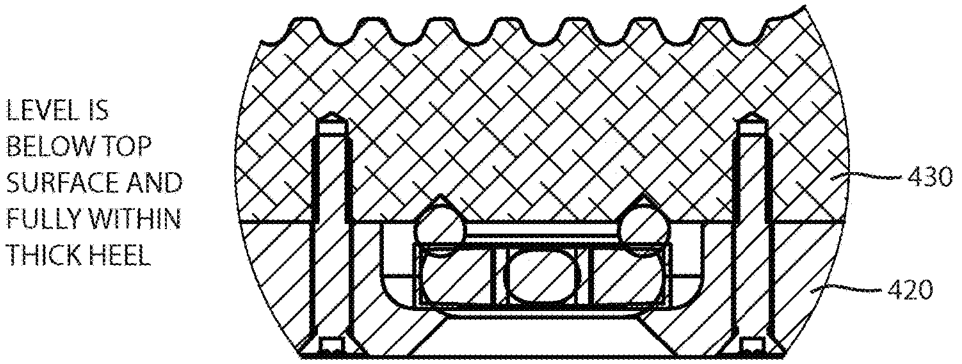

FIGS. 19 and 20 are somewhat related. In FIGS. 19*a* and 19*b*, the cushioning members 160 are above the vial 140 and adjacent to the blade 330, which features a downward projection 338, and the vial is fully within the thick heel 320. In FIGS. 20*a* and 20*b*, the cushioning members 160 are still above the vial 140 and adjacent to the blade 430, but the blade no longer includes a projection, and the vial is positioned a bit higher yet still fully within the thick heel 420.

Figure 21A:
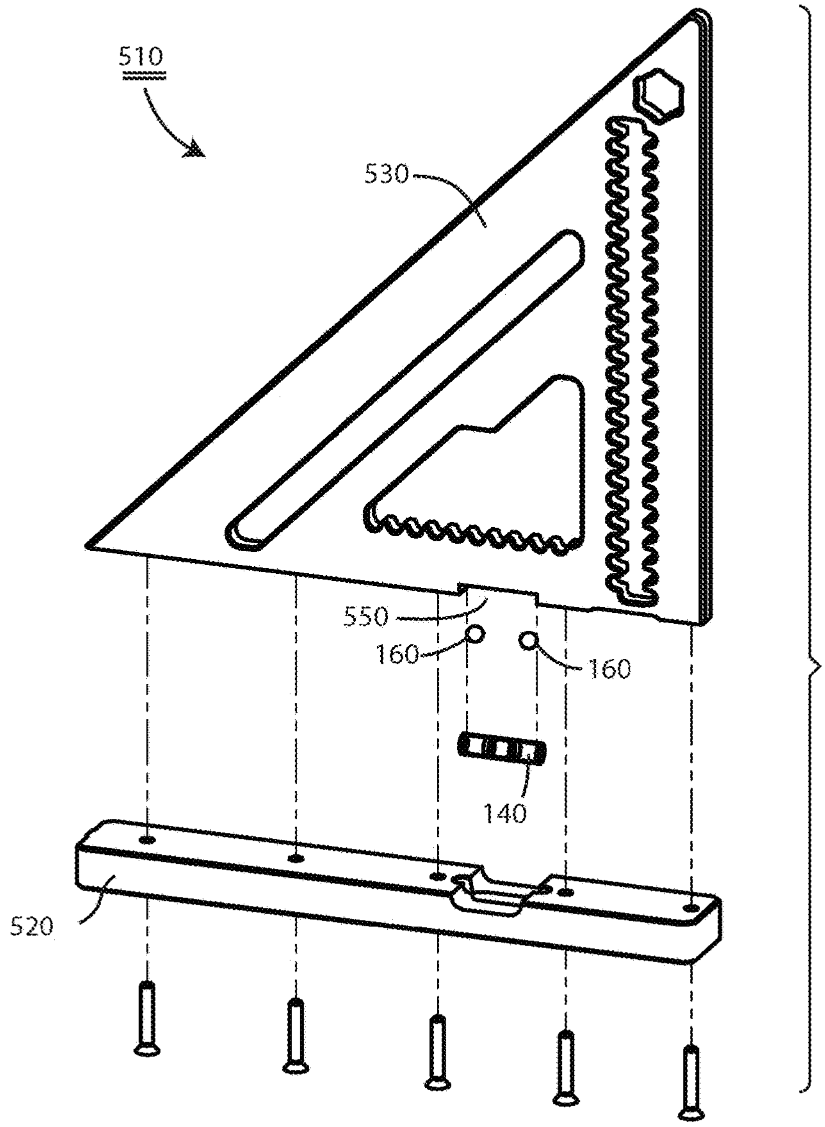
Figure 21B:
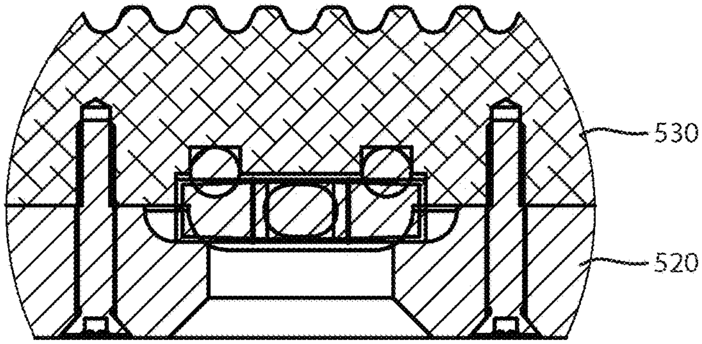
Figure 22A:
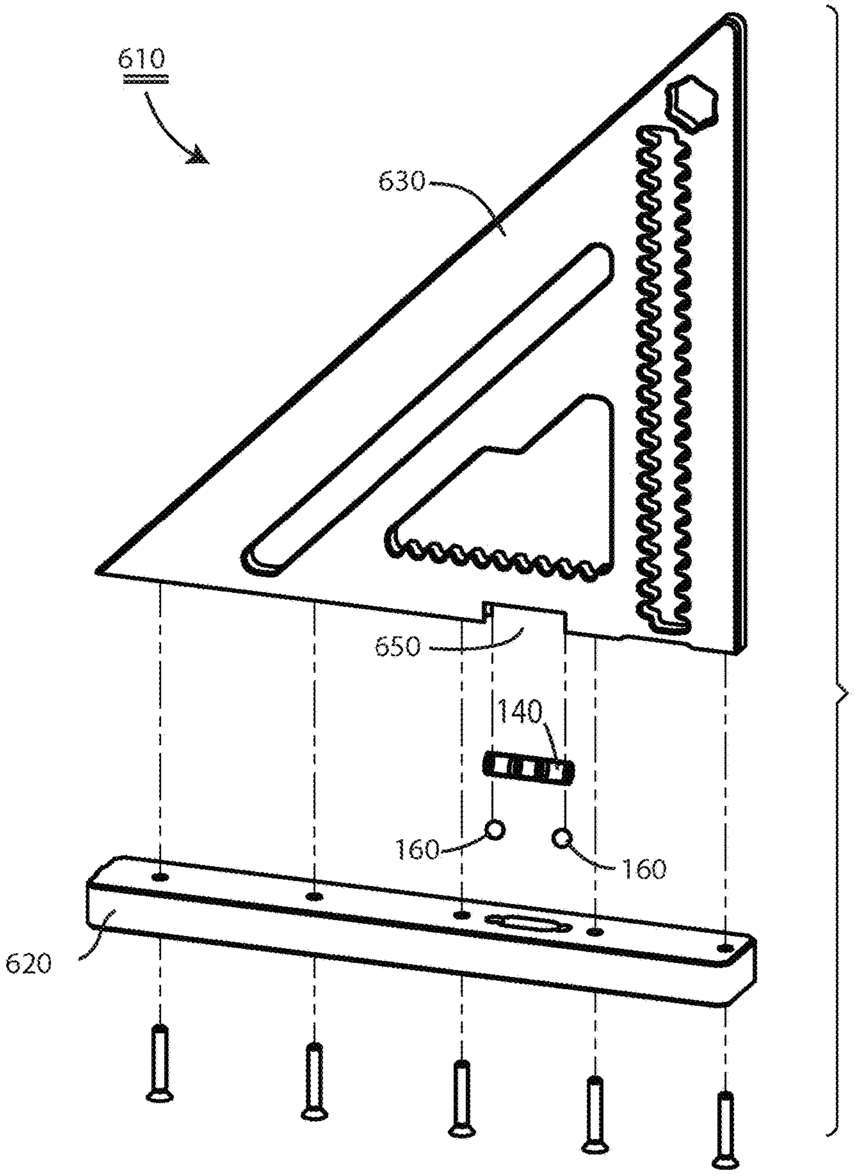
Figure 22B:
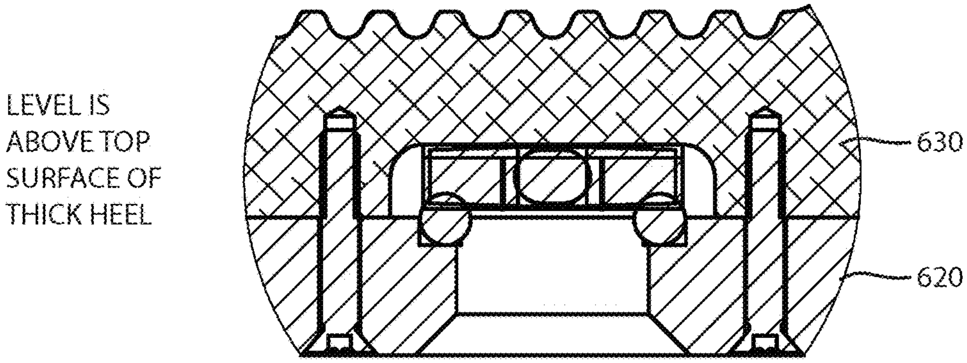
Figure 23A:
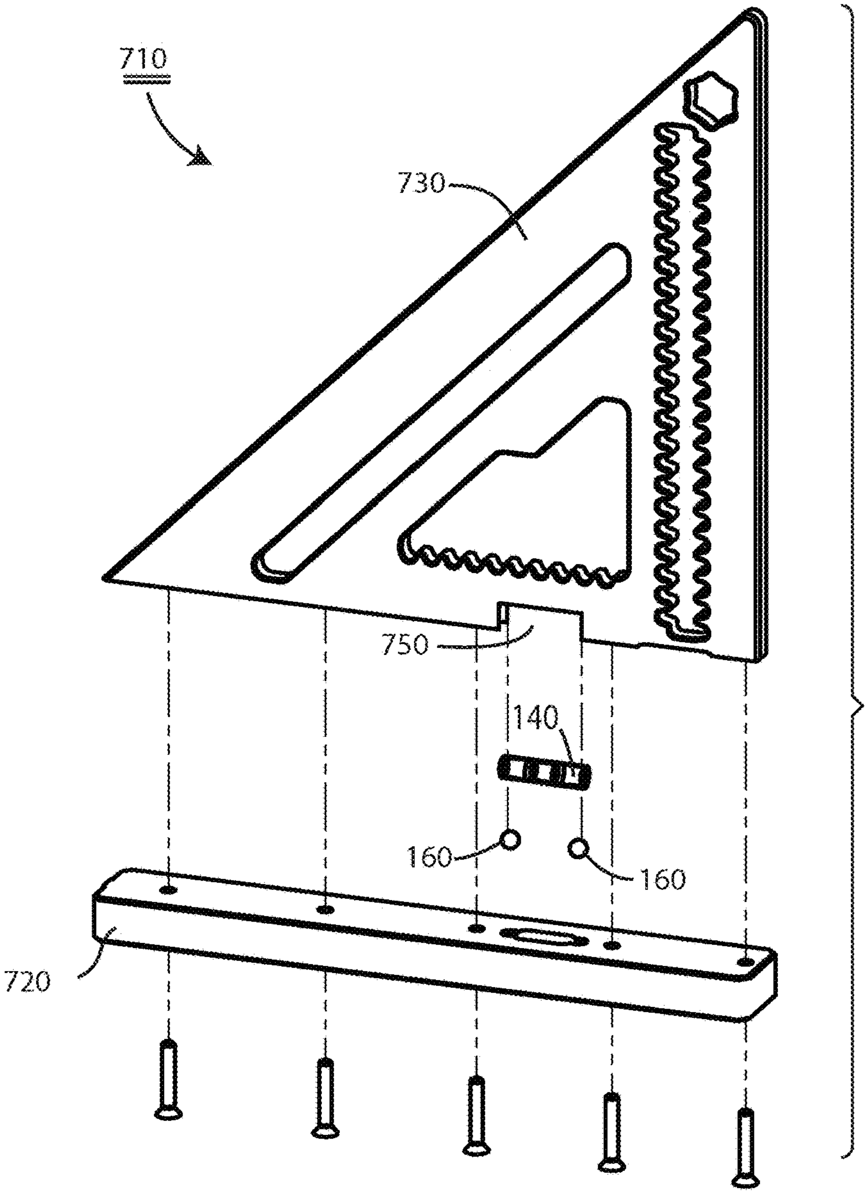
Figure 23B:
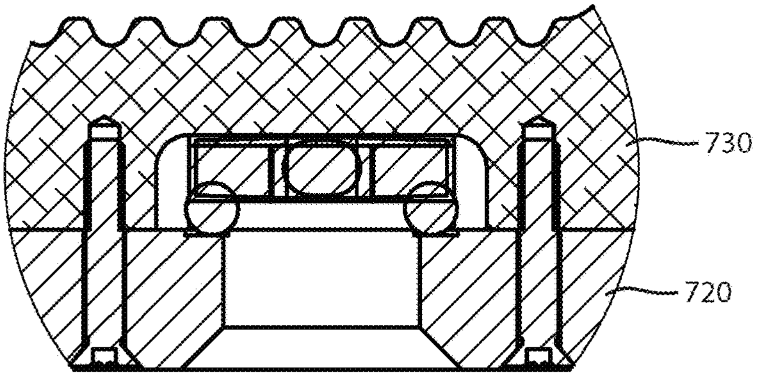

FIGS. 21 to 23 are also somewhat related in that the vial 140 is supported at least partially above a top surface of each heel 520, 620, 720, and 820, respectively. In FIGS. 21*a* and 21*b*, the cushioning members 160 are above the vial 140 and adjacent to the blade 530, but a small viewing window 550 has been provided in the blade 530 to allow the vial to be supported partially above the heel 520. In FIGS. 22*a* and 22*b*, the blade 630 features a medium-height viewing window 650, and the vial 140 is now supported fully above the heel 620. Noe that the cushioning members 160 are not on the heel-side of the vial 140. Finally, in FIGS. 23*a* and 23*b*, the blade 730 features a large viewing window 750, and the vial is supported well above the top surface of the heel 720.

Figure 24A:
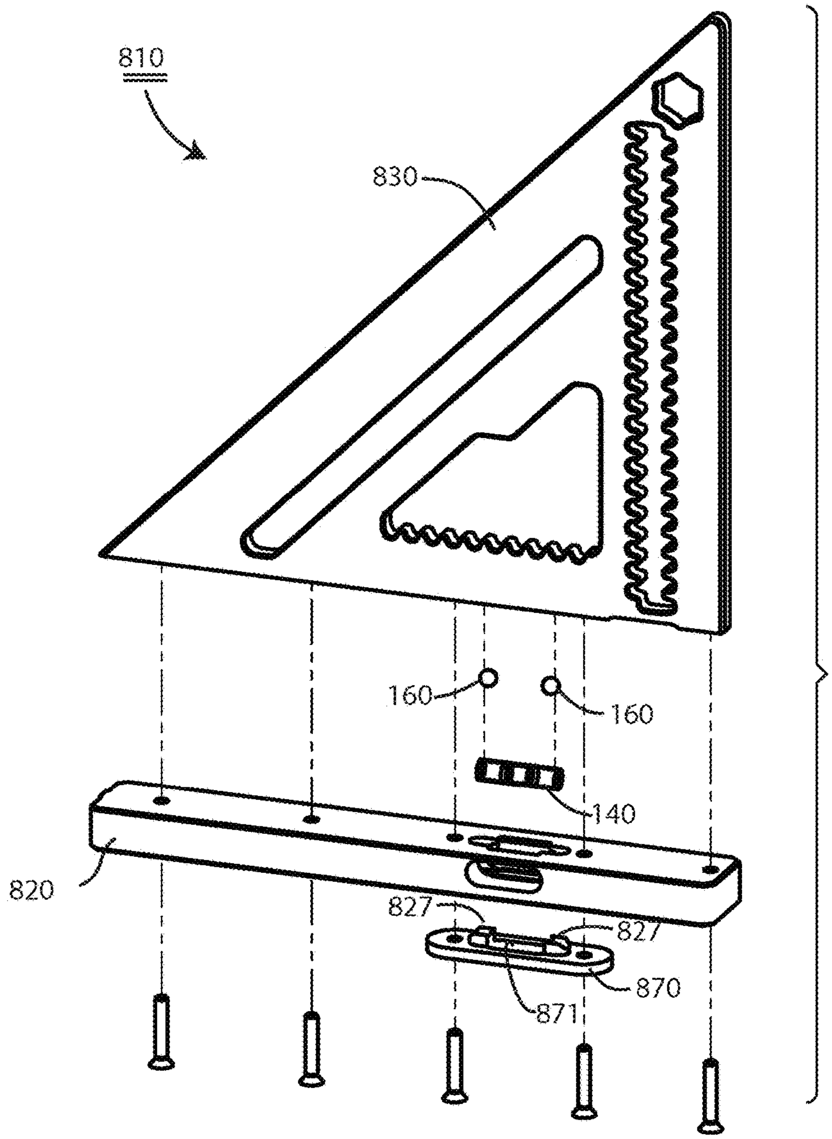
Figure 24B:
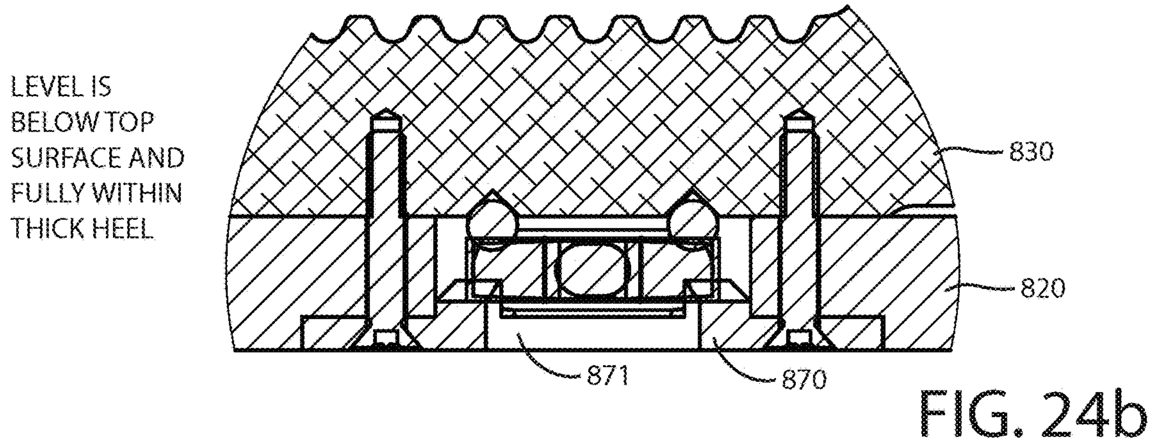

FIGS. 24*a* and 24*b*, lastly, show an embodiment where the heel 820 has a bottom plate 870. Here, the vial 140 is fully positioned in the heel 820, as with the embodiment of FIGS. 19*a* and 19*b*, but here the heel 820 includes a removable bottom plate 870 that contains a window 870 for viewing the vial 140, and carries a pair of upward saddles 827, 827. As a result, the vial 140 and cushioning members 160 are sandwiched between the blade 830 and a combination of the heel 820 and associated bottom plate 870. In this embodiment, if the user desires to replace the vial 140, the bottom plate 870 can be conveniently detached from the heel 820 by removing only two screws.

It can be appreciated that many other embodiments are possible without departing from the spirt or scope of the claimed invention.

The invention claimed is:

1. A square with a level vial comprising:

a blade of generally triangular shape having a first bottom edge, a second perpendicular edge that is perpendicular to the first bottom edge, and a third long edge that defines a hypotenuse between the first bottom edge and the second perpendicular edge;

a heel of generally parallelepiped shape with an elongated body having top, bottom, front, and back faces, and two ends;

a level vial;

a cushioning member;

fasteners for connecting the first bottom edge of the triangular blade to the top face of the heel; and interacting portions of the triangular blade and the heel configured to compress the level vial and cushioning member together when the first bottom edge of the triangular blade is connected to the top face of the heel.

2. The square of claim 1 wherein the cushioning member is positioned above the level vial.

3. The square of claim 1 wherein the cushioning member is positioned below the level vial.

4. The square of claim 1 wherein the cushioning member comprises a pair of spaced rubber balls.

5. The square of claim 1 wherein the level vial is held fully within the heel below the top face of the heel.

6. The square of claim 1 wherein the level vial is held partially above the top face of the heel.

7. The square of claim 1 wherein the level vial is held fully above the top face of the heel.

8. The square of claim 1 wherein the blade includes a viewing notch in its first bottom edge, and wherein the level vial is held at least partially above the top face of the heel and within the viewing notch.

9. The square of claim 8 wherein the level vial is held fully above the top face of the heel and within the viewing notch.

10. The square of claim 1 wherein the heel is a thin heel where the distance between the top and bottom faces is less than a height of the level vial.

11. The square of claim 1 wherein the heel is a thick heel where the distance between the top and bottom faces is greater than a height of the level vial.

12. The square of claim 1 wherein the first bottom edge of the blade has threaded apertures, wherein the heel has apertures that align with the threaded apertures in the first bottom edge of the blade, and wherein the fasteners comprise machine screws that pass through the apertures in the heel into the threaded apertures in the first bottom edge of the blade in order to tightly pull the blade and heel together.

13. A square with a level vial comprising:

a blade;

a heel;

a level vial;

a cushioning member;

interacting portions of the blade and heel configured to compress the level vial and cushioning member together when the blade is connected to the heel; and fasteners for connecting the blade to the heel.

14. The square of claim 13 wherein the cushioning member comprises a spaced pair of rubber balls.

15. The square of claim 14 wherein the spaced pair of rubber balls are located below the level vial and adjacent to the heel.

16. The square of claim 14 wherein the spaced pair of rubber balls are located above the level vial and adjacent to the blade.

17. The square of claim 13 wherein the blade includes a notch in a bottom edge of the blade, and wherein the level vial is held at least partially above the heel and within the notch.

18. The square of claim 17 wherein the interacting portions of the blade and heel comprise a spaced pair of seats in a bottom edge of the blade for holding a spaced pair of rubber balls above the level vial, and a spaced pair of saddles extending upwardly from a top face of the heel for holding the level vial above the heel and below the spaced pair of rubber balls, the interacting portions of the blade and heel holding the level vial above the heel within the notch.

19. The square of claim 17 wherein the interacting portions of the blade and heel comprise a pair of seats in the heel for holding the spaced pair of rubber balls below the level vial, and a spaced pair saddles extending downwardly from the blade at a top side of the notch for holding the level vial above the spaced pair of rubber balls, the interacting portions of the blade and heel holding the level vial above the heel within the notch.

20. The square of claim 13 wherein the heel has a height that is greater than a height of the level vial.

21. The square of claim 20 wherein the heel has a depression fully receiving the level vial within the heel.

22. The square of claim 20 wherein the heel has a depression partially receiving the level vial within the heel.

23. The square of claim 13 further comprising a removeable bottom plate in the heel, the removable bottom plate being smaller than a bottom face of the heel but sufficiently large for providing access to remove, clean, or replace the level vial without disconnecting the heel from the blade.

* * * * *